United States Patent
Chou et al.

(10) Patent No.: US 12,404,206 B2
(45) Date of Patent: *Sep. 2, 2025

(54) METHOD FOR MANUFACTURING ULTRA-THIN GLASS SUBSTRATES AND METHOD FOR MANUFACTURING DISPLAY PANEL

(71) Applicant: Flexi Glass Co.,Ltd., Bozhou (CN)

(72) Inventors: Hao-Yu Chou, Bozhou (CN);
Cheng-Chung Chiang, Bozhou (CN);
Tian-Ming Wu, Bozhou (CN);
Chun-Chieh Huang, Bozhou (CN);
Feng Chen, Bozhou (CN)

(73) Assignee: Flexi Glass Co., Ltd., Bozhou (CN)

( * ) Notice: Subject to any disclaimer, the term of this patent is extended or adjusted under 35 U.S.C. 154(b) by 136 days.

This patent is subject to a terminal disclaimer.

(21) Appl. No.: 18/036,710

(22) PCT Filed: Apr. 12, 2021

(86) PCT No.: PCT/CN2021/086425
§ 371 (c)(1),
(2) Date: May 12, 2023

(87) PCT Pub. No.: WO2022/110610
PCT Pub. Date: Jun. 2, 2022

(65) Prior Publication Data
US 2023/0406757 A1    Dec. 21, 2023

(30) Foreign Application Priority Data

Nov. 26, 2020 (CN) .......................... 202011344817.2

(51) Int. Cl.
*C03C 15/00* (2006.01)
(52) U.S. Cl.
CPC .................................. *C03C 15/00* (2013.01)

(58) Field of Classification Search
None
See application file for complete search history.

(56) References Cited

U.S. PATENT DOCUMENTS

| 10,233,112 B2 | 3/2019 | Hackert et al. |
| 11,050,042 B2 | 6/2021 | Zhang et al. |

(Continued)

FOREIGN PATENT DOCUMENTS

| CN | 102557467 A | 7/2012 |
| CN | 102799293 A | 11/2012 |

(Continued)

OTHER PUBLICATIONS

International Search Report for International Application No. PCT/CN2021/086425 dated Sep. 1, 2021 (22 pages).

(Continued)

*Primary Examiner* — Shamim Ahmed
(74) *Attorney, Agent, or Firm* — REISING ETHINGTON, P.C.

(57) ABSTRACT

A method for manufacturing ultra-thin glass substrates and a method for manufacturing a display panel are provided, including: providing a glass base material preset with n substrate areas and a skeleton area surrounding the substrate areas, wherein n is greater than or equal to 1; at least forming an etching protection layer, wherein, each etching protection layer includes a main area and at least one thinned area extending along a preset bending path; at least etching the skeleton area of the glass base material to separate the substrate areas from the glass base material, forming at least one bending stress dissipation groove, and forming a stress dissipation edge along an edge of each substrate area; removing the etching protection layer to get independent (Continued)

glass substrates having the bending stress dissipation groove. The method improves bending performance along the preset bending path.

9 Claims, 11 Drawing Sheets

(56) References Cited

U.S. PATENT DOCUMENTS

| | | | |
|---|---|---|---|
| 11,296,309 B2 | 4/2022 | Liu et al. | |
| 11,851,363 B2 * | 12/2023 | Chou | C03C 15/00 |
| 2011/0019354 A1 | 1/2011 | Prest et al. | |
| 2015/0060401 A1 | 3/2015 | Chang et al. | |
| 2020/0392038 A1 | 12/2020 | Park et al. | |
| 2021/0078899 A1 | 3/2021 | Da et al. | |

FOREIGN PATENT DOCUMENTS

| | | |
|---|---|---|
| CN | 102992599 A | 3/2013 |
| CN | 103304154 A | 9/2013 |
| CN | 103508663 A * | 1/2014 |
| CN | 103723927 A | 4/2014 |
| CN | 104743889 A | 7/2015 |
| CN | 108666352 A | 10/2018 |
| CN | 109081561 A | 12/2018 |
| CN | 110429106 A | 11/2019 |
| CN | 110707125 A | 1/2020 |
| CN | 111601780 A | 8/2020 |
| CN | 112341004 A | 2/2021 |
| CN | 112479596 A | 3/2021 |
| CN | 112573834 A | 3/2021 |
| JP | 2009093744 A | 4/2009 |
| JP | 2011164508 A | 8/2011 |
| JP | 2012020902 A | 2/2012 |
| JP | 2014047091 A | 3/2014 |
| JP | 2015063426 A | 4/2015 |
| JP | 2018081242 A | 5/2018 |
| KR | 20160131103 A | 8/2016 |
| KR | 102150391 B1 | 9/2020 |
| TW | 201348165 A | 12/2013 |

OTHER PUBLICATIONS

Chinese Office Action for Chinese Application No. 202011344817.2 dated Apr. 25, 2022 (10 pages).
English Translation of Chinese Office Action for Chinese Application No. 202011344817.2 dated Apr. 25, 2022 (9 pages).
Chinese First Office Action for Chinese Patent Application No. 202011157028.8 dated Mar. 25, 2022 (17 pages).
Chinese First Office Action for Chinese Patent Application No. 202011158629.0 dated Apr. 2, 2022 (16 pages).
Chinese Second Office Action for Chinese Patent Application No. 202011158629.0 dated Sep. 16, 2022 (12 pages).
Notification to Grant Patent Right for Invention for Chinese Patent Application No. 202011158629.0 dated Nov. 22, 2023 (5 pages).
Korean Office Action for Korean Patent Application No. 10-2021-0139156 dated Jul. 12, 2023 (34 pages).
Non-Final Office Action for U.S. Appl. No. 17/218,306 dated May 17, 2023 (23 pages).

* cited by examiner

# METHOD FOR MANUFACTURING ULTRA-THIN GLASS SUBSTRATES AND METHOD FOR MANUFACTURING DISPLAY PANEL

CROSS-REFERENCE TO RELATED APPLICATIONS

This application is based upon PCT patent application No. PCT/CN2021/086425, filed on Apr. 12, 2021, which claims priority to Chinese Patent Applications No. 202011344817.2, filed on Nov. 26, 2020, the entire contents of which are incorporated herein by reference.

TECHNICAL FIELD

The present disclosure relates to technology of manufacturing a display panel, and more particularly to a method for manufacturing ultra-thin glass substrates and a method for manufacturing a display panel.

BACKGROUND

An ultra-thin glass substrate (UTG substrate) is an important part of a flexible cover plate. The quality of the ultra-thin glass substrate is key to realizing a smaller bending radius that is close to or equal to 2 mm. Especially when the UTG substrate is cut to a certain size, the edge needs to be specially processed to overcome the defects, such as edge breakages, microcracks, etc. caused by cutting, to prevent the substrate from being cracked for the defects during being bent. In general, two aspects of problems are needed to be solved: (1) using which kind of cutting method to achieve a relatively straight edge, (2) using a processing method such as polishing to overcome the edge defects.

Nowadays, scribing wheel cutting is limited to linear cutting. Using the scribing wheel cutting for irregular cutting (such as edge fillets) is still hard. Furthermore, the UTG substrate without chemical reinforcing processing and having a thickness of about 100 um is very fragile and will easily generate fragments of high proportion or unexpected defects, such as edge breakages, corner missing, etc., when being under mechanical pressure during the scribing wheel cutting. These defects are fatal to the following edge polishing and could directly cause the substrate to be scrapped. Therefore, it's important to achieve a substrate with a straight edge using an appropriate cutting method.

Compared with the scribing wheel cutting, laser cutting without mechanical forces can realize a better edge-cutting effect and may be a main cutting method for future ultra-thin glass substrates. Laser cutting means using the energy released when a laser beam irradiates a surface of a workpiece to melt and evaporate a part of the workpiece, so as to cut the workpiece into several pieces. The laser cutting applies no pressure to the surface of the glass. Therefore, the glass substrate will not be damaged, and laser cutting can be applied for different kinds of irregular cutting.

On the other hand, during the processing and transporting of the UTG substrates, quality defects are easy to occur, such as scratches to the surface of the glass or damage caused by the glasses pressing each other. Nowadays, a protection ink layer is sprayed on two surfaces of the glass to reduce or eliminate the above defects. The manufacturing process includes: cutting a large sheet of a UTG base material glass—edge polishing—chemical reinforcing-spraying a protection ink layer. At last, function layers can be coated on the UTG substrate processed by the chemical reinforcing, to form a foldable cover plate.

Therefore, a general method for manufacturing an ultra-thin glass substrate includes: spraying a protection ink layer on the UTG substrate, laser cutting the UTG substrate to get a desired size, and then performing following manufacturing processes. However, it's a tough task to spray the ink uniformly on the surface of the UTG substrate, especially it's hard to eliminate bubbles, make sure the film layer has a uniform thickness and a uniform color, and make sure the spraying environment is clean, etc. Meanwhile, during the laser cutting process, the laser often has the problem of scattering for the laser cutting path may not be sprayed uniformly, then the glass is not thoroughly cut, and the defects, such as the glass being hard to be separated into pieces or serious edge breakages, etc. may occur, which will seriously affect the following edge polishing process.

SUMMARY

To overcome the defects of the existing technology, the present disclosure provides a method for manufacturing ultra-thin glass substrates and a method for manufacturing a display panel, which can form a bending stress dissipation groove on the glass base material while obtaining the glass substrate from the glass base material, to improve bending performance along the preset bending path of the panel in the subsequent panel manufacturing process, greatly saving the time of manufacturing a function layer and improving product quality of the ultra-thin glass substrate.

In an embodiment of the present disclosure, a method for manufacturing ultra-thin glass substrates is provided, including the following steps:

S510: providing a glass base material preset with n substrate areas and a skeleton area surrounding the substrate areas, wherein n is greater than or equal to 1;

S520: at least forming an etching protection layer on each of an upper surface and a lower surface of each substrate area of the glass base material, respectively, wherein, each etching protection layer includes a main area and at least one thinned area extending along a preset bending path;

S530: at least etching the skeleton area of the glass base material to separate the substrate areas from the glass base material, forming at least one bending stress dissipation groove extending along the preset bending path on each substrate area through the thinned area, and forming a stress dissipation edge along an edge of each substrate area;

S540: removing the etching protection layer to get independent glass substrates having the bending stress dissipation groove.

In some embodiments, the substrate areas are arranged in a matrix arrangement on the glass base material, and adjacent substrate areas are separated from each other by the skeleton area.

In some embodiments, the thinned area is a strip-shaped area extending along the preset bending path.

In some embodiments, at least one narrow slit parallel to the preset bending path is provided in the thinned area, and a part of each substrate area is exposed from the narrow slit.

In some embodiments, a thickness of the thinned area of the etching protection layer is smaller than a thickness of the main area of the etching protection layer.

In some embodiments, the etching protection layer includes an etching buffer layer to reduce etching and an etching barrier layer to block etching, the etching buffer layer and the etching barrier layer are set on a same layer, the etching buffer layer forms the thinned area, and the etching barrier layer forms the main area of the etching protection layer.

In some embodiments, by using one etching process, the whole skeleton area of the glass base material is removed, the at least one bending stress dissipation groove extending along the preset bending path is formed on each substrate area, and the stress dissipation edge is formed along the edge of each substrate area.

In some embodiments, the step S520 includes the following steps:
- S521: forming a polymeric reinforcing layer on at least one side of the upper surface and the lower surface of each substrate area of the glass base material, wherein the polymeric reinforcing layer comprises a slit, components of the polymeric reinforcing layer include acrylic, organic polymer material containing silicon, epoxy resin, fluororesin, polyamide, polyimide, polycarbonate, polyethylene terephthalate and poly-1,4-cyclohexanedimethyl terephthalate;
- S522: forming an etching protection layer on one side of the polymeric reinforcing layer away from each substrate area, the etching protection layer having at least one narrow slit exposing a part of each substrate area, a projection of the narrow slit of the polymeric reinforcing layer coinciding with a projection of the narrow slit of the etching protection layer on the substrate area.

In some embodiments, the step S520 includes the following steps:
- S523: forming a panel function layer on at least one side of the upper surface and the lower surface of each substrate area of the glass base material, the panel function layer having a narrow slit, wherein the panel function layer includes one of a TFT rear panel, an organic light emitting layer, a touch detection layer, a fingerprint identification layer, and a cover plate or a combination thereof;
- S524: forming the etching protection layer on one side of the panel function layer away from each substrate area, the etching protection layer having at least one narrow slit exposing a part of each substrate area, a projection of the narrow slit of the panel function layer coinciding with a projection of the narrow slit of the etching protection layer on the substrate area.

In another embodiment of the present disclosure, a method for manufacturing a display panel including the method for manufacturing ultra-thin glass substrates is provided, wherein the bending stress dissipation groove is configured to be located on the bending path of the display panel.

The aim of the present discloser is providing a method for manufacturing ultra-thin glass substrates, which can form a bending stress dissipation groove on the glass base material while obtaining the glass substrate from the glass base material, to improve bending performance along the preset bending path of the panel in the subsequent panel manufacturing process, greatly saving the time of manufacturing a function layer and improving product quality of the ultra-thin glass substrate.

BRIEF DESCRIPTION OF THE DRAWINGS

The foregoing and other features, and advantages of the invention are apparent from the following detailed description taken in conjunction with the accompanying drawings in which.

DETAILED DESCRIPTION

In the following, embodiments of the present disclosure will be described in detail with reference to the figures. The concept of the present disclosure can be implemented in a plurality of forms, and should not be understood to be limited to the embodiments described hereafter. In the contrary, these embodiments are provided to make the present disclosure more comprehensive and understandable, and so the conception of the embodiments can be conveyed to those skilled in the art fully. Same reference signs in the figures refer to same or similar elements, so repeated descriptions of them will be omitted.

Figure 1:
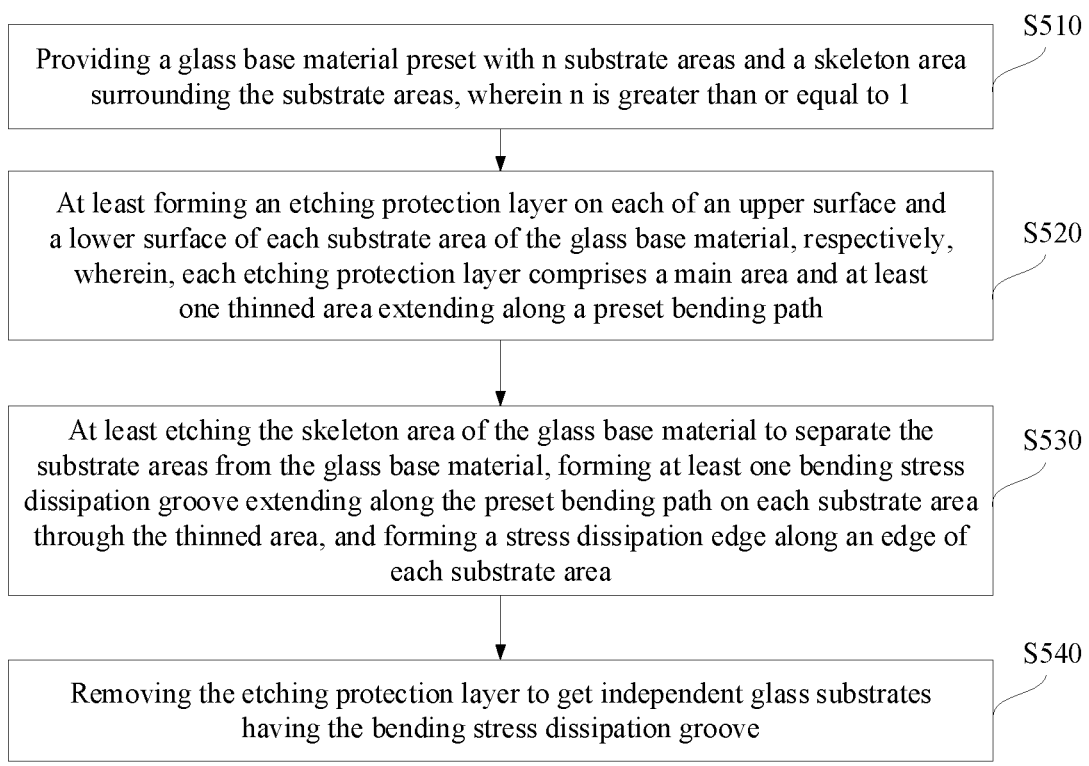
FIG. 1 is a flow chart of a method for manufacturing ultra-thin glass substrates of an embodiment of the present disclosure.

FIG. 1 is a flow chart of a method for manufacturing ultra-thin glass substrates of an embodiment of the present disclosure. In the embodiment, the method for manufacturing ultra-thin glass substrates of the present disclosure includes the following steps:
- S510: providing a glass base material 1 preset with n substrate areas 11 and a skeleton area 12 surrounding the substrate areas 11, wherein n is greater than or equal to 1;
- S520: at least forming an etching protection layer on each of an upper surface and a lower surface of each substrate area 11 of the glass base material 1, respectively, wherein the etching protection layer includes a main area and at least one thinned area extending along a preset bending path;
- S530: at least etching the skeleton area 12 of the glass base material 1 to separate the substrate areas 11 from the glass base material 1, forming at least one bending stress dissipation groove along the preset bending path on each substrate area 11 through the thinned area, and forming a stress dissipation edge 13 along an edge of each substrate area 11;
- S540: removing the etching protection layer to get independent glass substrates having the bending stress dissipation groove.

During the manufacturing process of the present disclosure, a scribing wheel and laser are no longer needed, the bending stress dissipation groove can be formed on the glass base material while obtaining the glass substrate from the glass base material, to improve bending performance along the preset bending path of the panel in the subsequent panel manufacturing process, greatly saving the time of manufacturing a function layer and improving product quality of the ultra-thin glass substrate.

In a preferable embodiment, the substrate areas 11 are arranged in a matrix arrangement on the glass base material 1, and adjacent substrate areas 11 are separated from each other by the skeleton area 12, but the present disclosure is not limited to this.

In a preferable embodiment, the thinned area is a strip-shaped area extending along the preset bending path, but the present disclosure is not limited to this.

In a preferable embodiment, at least one narrow slit parallel to the preset bending path is provided in the thinner area, and a part of each substrate area 11 is exposed from the narrow slit, but the present disclosure is not limited to this.

In a preferable embodiment, a thickness of the thinned area of the etching protection layer is smaller than a thickness of the main area of the etching protection layer, but the present disclosure is not limited to this.

In a preferable embodiment, the etching protection layer includes an etching buffer layer to reduce etching and an etching barrier layer to block etching, the etching buffer layer and the etching barrier are set on a same layer. The material of the etching buffer layer and the material of the etching barrier layer can be different to achieve different blocking etching effects in different areas. The etching buffer layer forms the thinned area, and the etching barrier layer forms the main area of the etching protection layer, but the present disclosure is not limited to this.

In a preferable embodiment, by using one etching process, the whole skeleton area 12 of the glass base material 1 is removed, at least one bending stress dissipation groove extending along the preset bending path is formed on each substrate area 11, and the stress dissipation edge 13 is formed along the edge of each substrate area 11, but the present disclosure is not limited to this.

In a preferable embodiment, the stress dissipation edge is a circular-arc edge, a blade edge, or a polygonal edge, the blade edge or the polygonal edge includes at least one straight hypotenuse or arcuate hypotenuse, an angle between the hypotenuse and the glass base material ranges from 15° to 90°, a thickness of the glass base material ranges from 10 um to 150 um; the stress dissipation edge surrounds the edge of the substrate area, and a width of the stress dissipation edge ranges from 5 um to 300 um, but the present disclosure is not limited to this.

In a preferable embodiment, the method further includes a step S550 performed after the step S540, the step S550 includes: forming a polymeric reinforcing layer 24 on at least one side of the upper surface and the lower surface of each substrate area 11 of the glass base material, wherein components of the polymeric reinforcing layer 24 include acrylic, organic polymer material containing silicon (silane, silicone, silicon rubber), epoxy resin, fluororesin, polyamide, polyimide, polycarbonate (PC), polyethylene terephthalate (PET) and poly-1,4-cyclohexanedimethyl terephthalate (PCT).

In a preferable embodiment, by using a first etching process, the whole skeleton area of the glass base material is removed, and the substrate areas protected by the etching protection layer are reserved. By using a second etching process, the at least one bending stress dissipation groove extending along the preset bending path is formed on each substrate area, and the stress dissipation edge is formed along the edge of each substrate area, but the present disclosure is not limited to this.

FIGS. 2-9 are schematic views of a first kind of processes of the method for manufacturing ultra-thin glass substrates of the present disclosure. As shown in FIGS. 2-9, the first kind of processes of the method for manufacturing ultra-thin glass substrates are as follows.

Figure 2:
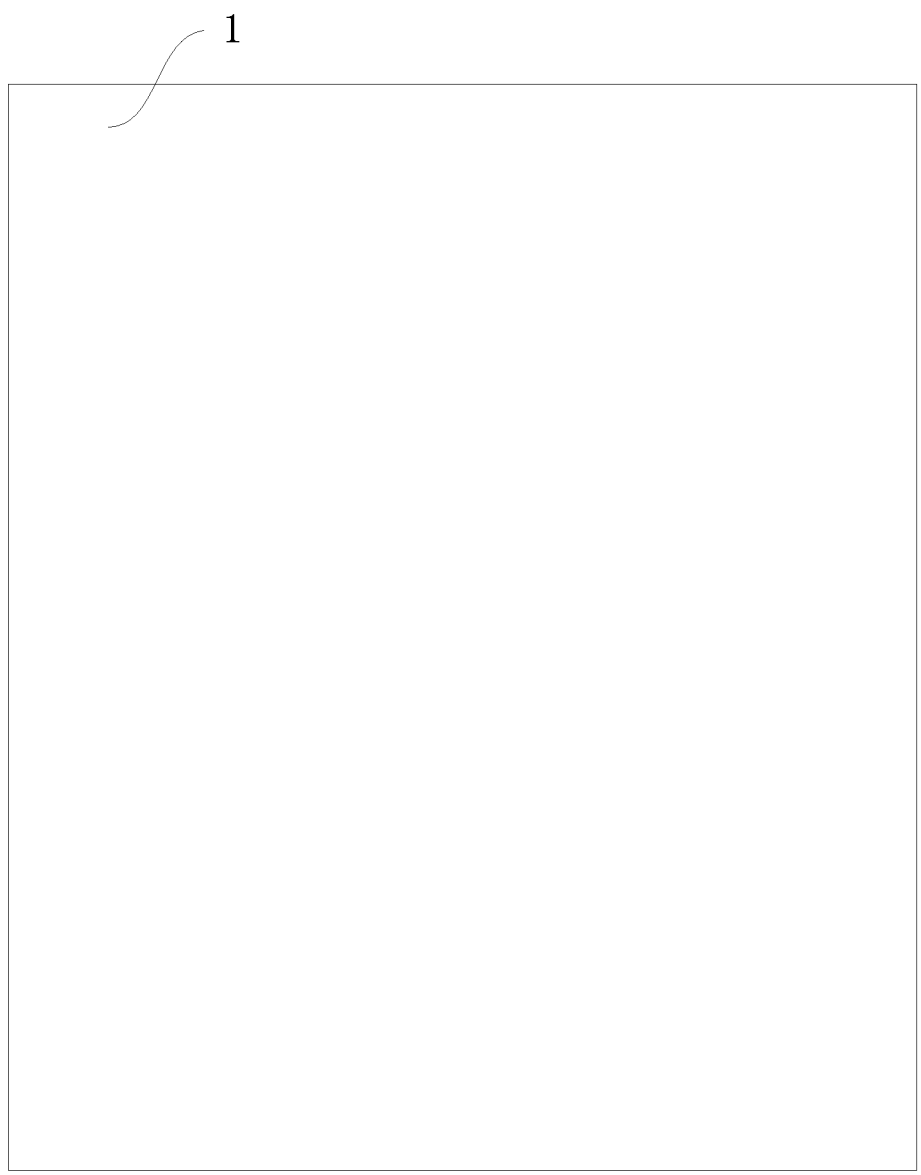
FIGS. 2-9 are schematic views of a first kind of processes of the method for manufacturing ultra-thin glass substrates of the present disclosure.

As shown in FIG. 2, firstly, a glass base material 1 is provided, a thickness of the glass base material 1 ranges from 10 um to 150 um. A plurality of the substrate areas 11 are arranged on the glass base material 1 in a matrix arrangement, and adjacent substrate areas 11 are separated from each other by a skeleton area 12.

Figure 3:
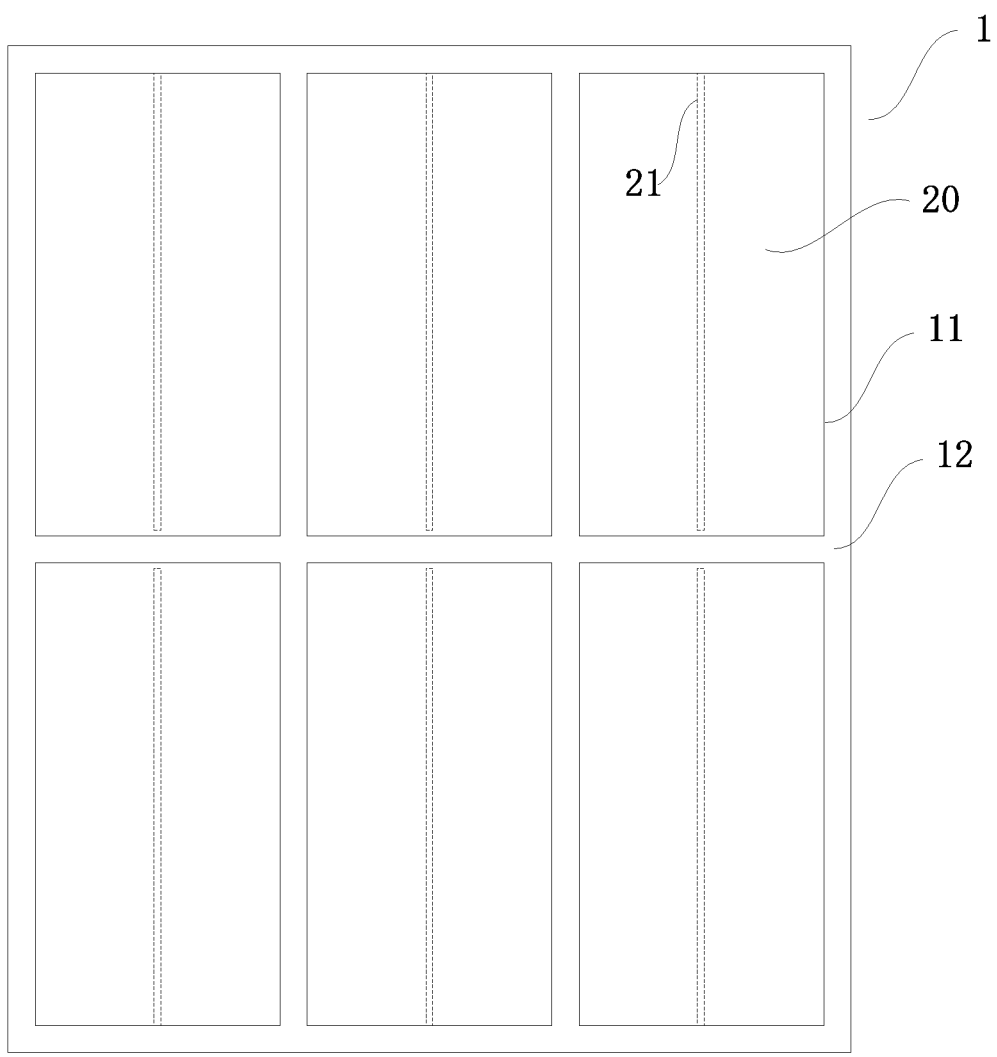
Figure 4:
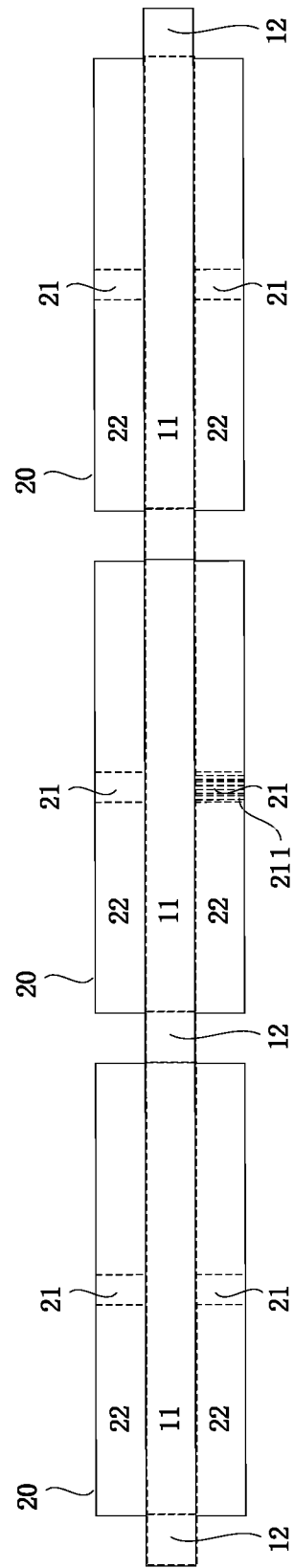
Figure 5:
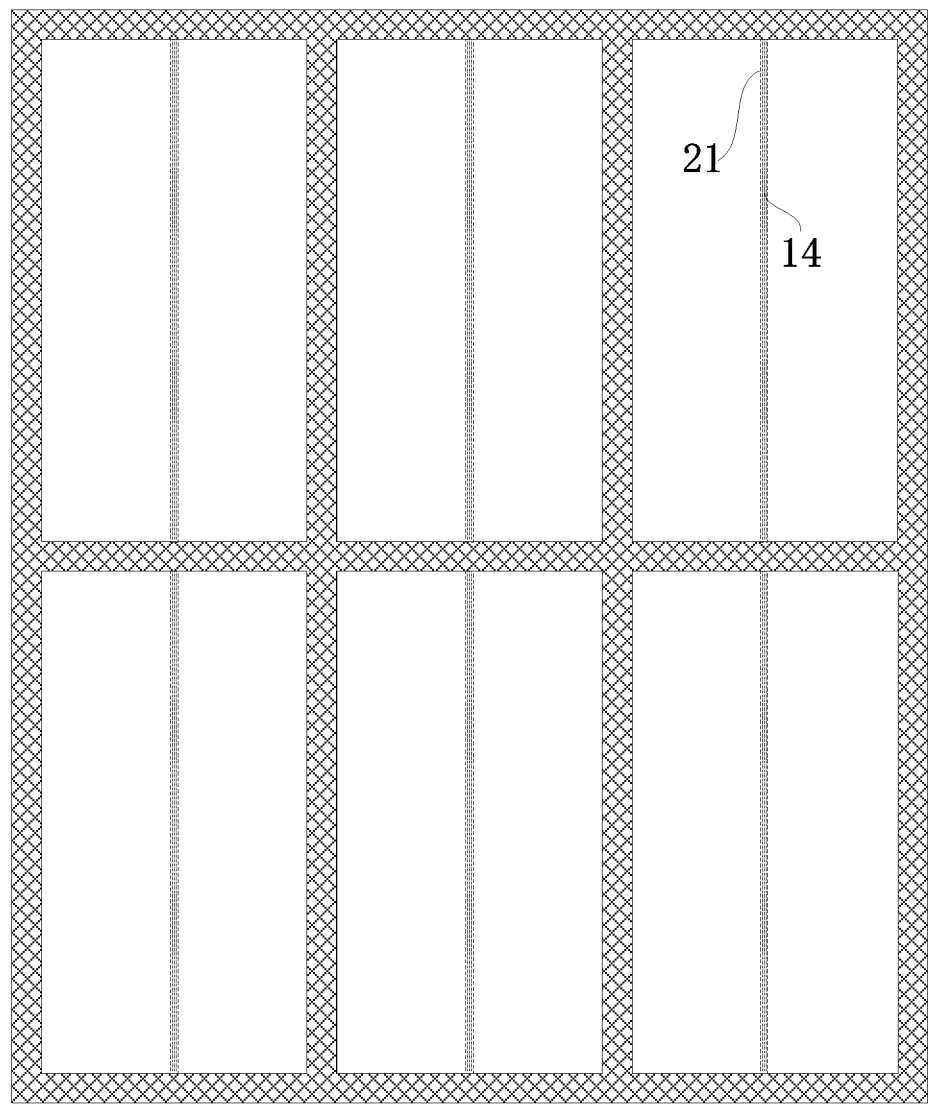
Figure 6:
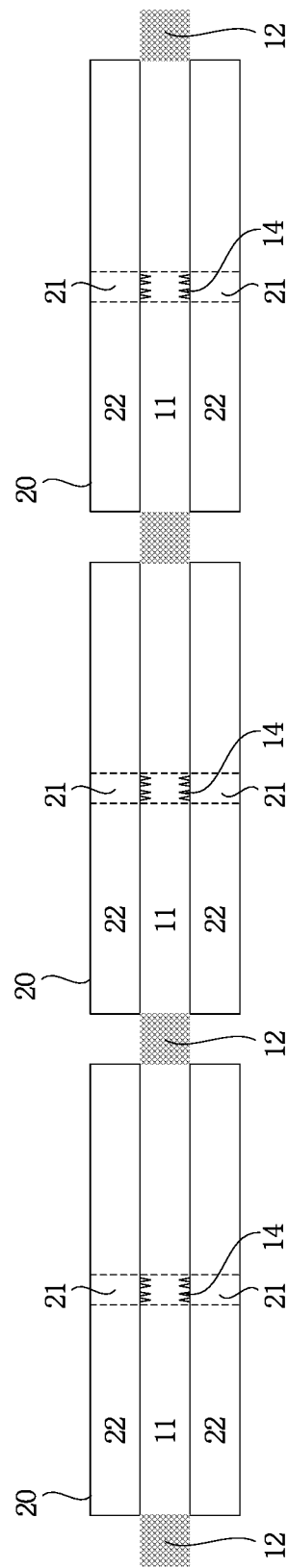
Figure 7:
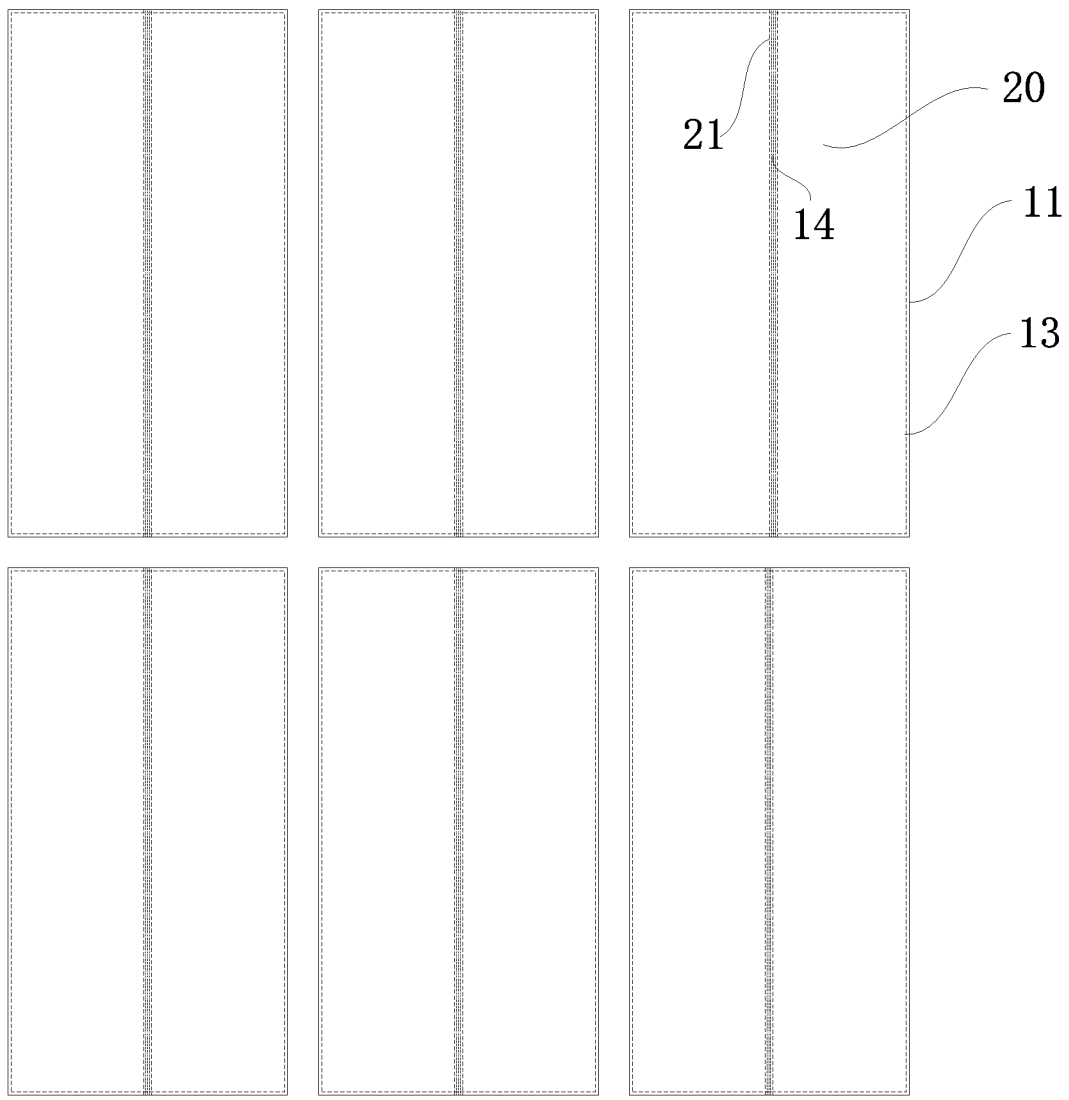
Figure 8:
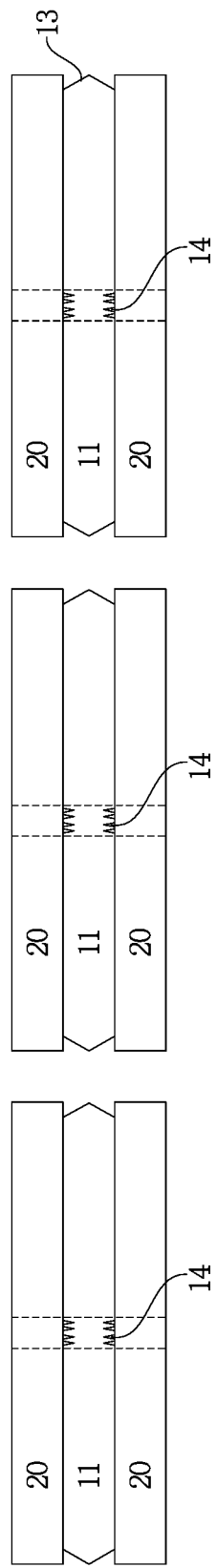

As shown in FIGS. 3 and 4, n substrate areas 11 and a skeleton area 12 surrounding the substrate areas 11 are preset on the glass base material 1, wherein n is greater than or equal to 1. An etching protection layer 20 is formed on each of an upper surface and a lower surface of each substrate area 11, respectively. The etching protection layer 20 only covers the upper surface and the lower surface of each substrate area 11, an upper surface and a lower surface of the skeleton area 12 are both exposed from the etching protection layer 20. Therefore, the upper surface and the lower surface of the skeleton area 12 can be both etched at the same time during the following etching process, and a stress dissipation edge 13 having a plurality of stress dissipation surfaces can be easily formed. The substrate areas 11 are arranged in a matrix arrangement on the glass base material 1, adjacent substrate areas 11 are separated from each other by the skeleton area 12. The etching protection layer 20 includes a main area 22 and at least one thinned area 21 extending along a preset bending path. In the embodiment, the thinned area 21 is a strip-shaped area extending along the preset bending path. At least one narrow slit 211 parallel to the preset bending path is set in the thinner area 21 (the narrow slit 211 is only schematically shown in one thinned area 21), and a part of the substrate area 11 is exposed from the narrow slit 211, so that, during the etching, at least one bending stress dissipation groove 14 extending along the preset bending path is formed on each substrate area 11.

As shown in FIGS. 5, 6, 7, 8, the skeleton area 12 of the glass base material 1 is etched, to separate the substrate areas 11 from the glass base material 1, at least one bending stress dissipation groove 14 extending along the preset bending path is formed on each substrate area 11 through the thinned area, and a stress dissipation edge 13 extending along an edge of each substrate area 11 is formed. The etching buffer layer cannot completely block the etching to the substrate area 11 below the etching buffer layer, and can only weaken the etching to the substrate area 11, so as to leave shallow grooves extending along the preset bending path in the substrate area 11 at a position corresponding to the thinned area (as a comparison, the part of the substrate area 11 covered by the etching barrier layer is completely unaffected by etching). These shallow grooves can disperse bending stress during panel bending and serve as bending stress dissipation grooves. In the embodiment, by using a first etching process, the whole skeleton area 12 of the glass base material 1 is removed, and the substrate area 11 protected by the etching protection layer 20 is reserved. The stress dissipation edge 13 is a blade edge and surrounds the edge of the substrate area 11, and a width of the stress dissipation edge 13 ranges from 5 um to 300 um. In the embodiment, through one-time etching, all the skeleton area 12 of the glass base material 1 is removed, at least one bending stress dissipation groove extending along the preset bending path is formed on each substrate area 11, and the stress dissipation edge 13 is formed along the edge of each substrate area 11. That is, through one-time etching, three etching effects are realized at the same time. In the embodiment, on each of the two sides of the substrate area 11, symmetric bending stress dissipation grooves 14 are formed, so that the stress of two bending directions can be dispersed. In an alternative embodiment, the bending stress dissipation groove 14 can only be provided on one side of the substrate area 11, to disperse the stress of only one bending direction.

Figure 9:
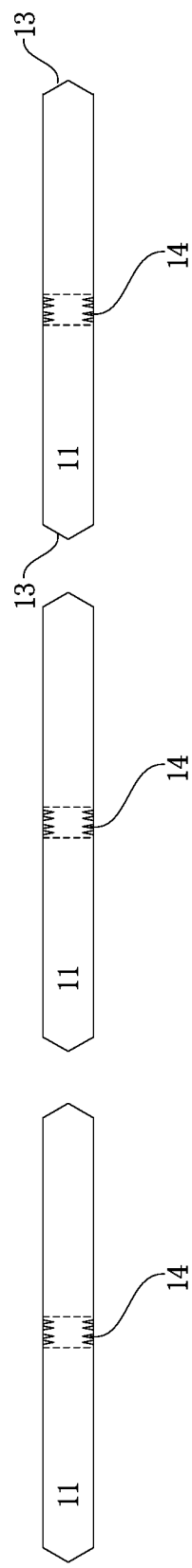

At last, as shown in FIG. 9, the etching protection layer 20 is removed to get independent glass substrates 14 having the bending stress dissipation groove.

Figure 10:
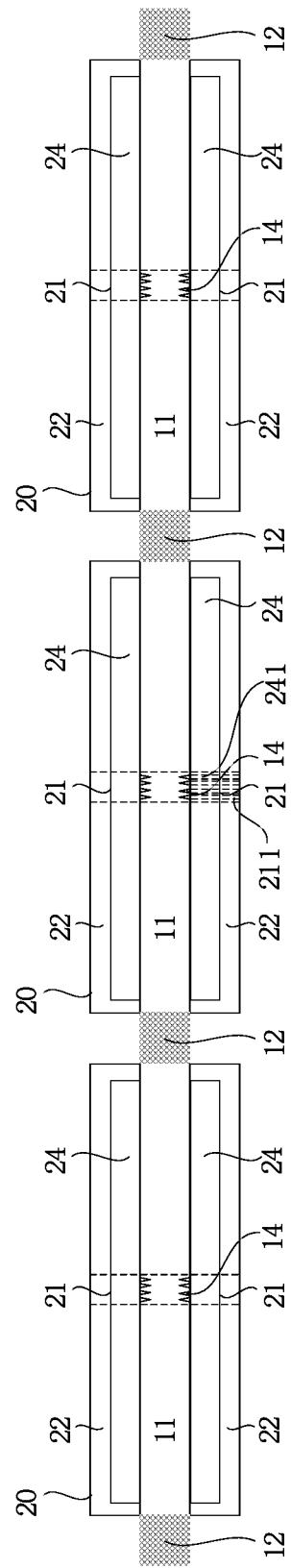
FIG. 10 is a schematic view of a second kind of an intermediate process of the method for manufacturing ultra-thin glass substrates of the present disclosure.

FIG. 10 is a schematic view of a second kind of an intermediate process of the method for manufacturing ultra-thin glass substrates of the present disclosure. As shown in FIG. 10, the differences between the second kind of processes of the method for manufacturing ultra-thin glass substrates and the first kind of processes are: in the second kind of processes, the step S520 includes: S521: forming a polymeric reinforcing layer 24 on at least one side of the upper surface and the lower surface of each substrate area 11 of the glass base material, wherein the polymeric reinforcing layer 24 includes a narrow slit 241 (the narrow slit 241 is only schematically shown in a part of the polymeric reinforcing layer 24), and components of the polymeric reinforcing layer 24 include: acrylic, organic polymer material containing silicon (silane, silicone, silicon rubber), epoxy resin, fluororesin, polyamide, polyimide, polycarbonate (PC), polyethylene terephthalate (PET) and poly-1,4-cyclohexanedimethyl terephthalate (PCT); S522, forming an etching protection layer on one side of the polymeric reinforcing layer 24 away from the substrate area 11, the etching protection layer 20 has at least one narrow slit 211 exposing a part of the substrate area 11, a projection of the narrow slit 241 of the polymeric reinforcing layer 24 coincides with a projection of the narrow slit 211 of the etching protection layer 20 on the substrate area 11, so as to form the bending stress dissipation groove 14 on a corresponding part of the substrate area 11 through the glass substrate covered by the polymer reinforcement layer 24, the narrow slit 211 of the etching protection layer 20 and the narrow slit 241 of the polymer reinforcement layer 24. The subsequent processes are the same as those in the first process and will not be repeated here. Therefore, in the second kind of processes, the overall flexibility of the glass substrate is enhanced when it is bent and restored, thereby improving the anti-cracking properties of the glass substrate; at the same time, the bending stress dissipation groove 14 formed on the glass substrate improves bending performance along the preset bending path of the panel in the subsequent panel manufacturing process, greatly saving the time of manufacturing a function layer and improving product quality of the ultra-thin glass substrate.

Figure 11:
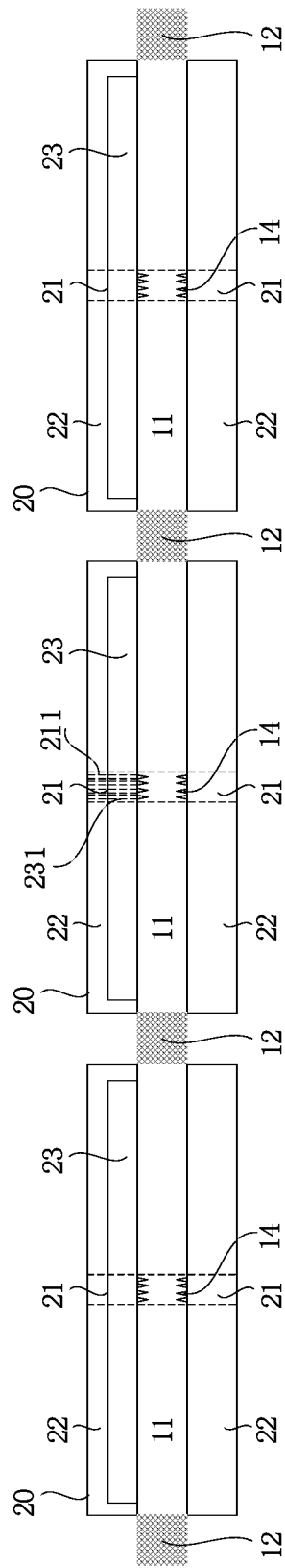
FIG. 11 is a schematic view of a third kind of an intermediate process of the method for manufacturing ultra-thin glass substrates of the present disclosure.

FIG. 11 is a schematic view of a third kind of an intermediate process of the method for manufacturing ultra-thin glass substrates of the present disclosure. As shown in FIG. 11, the differences between the third kind of processes of the method for manufacturing ultra-thin glass substrates and the first kind of processes are: in the third kind of processes, the step S520 includes: S523: a panel function layer 23 is formed on at least one side of the upper surface and the lower surface of each substrate area 11 of the glass base material, the panel function layer 23 has at least one narrow slit 231 (the narrow slit 231 is only schematically shown in a part of the panel function layer 23). The panel function layer 23 includes one of a TFT rear panel, an organic light emitting layer, a touch detection layer, a fingerprint identification layer, and a cover plate or a combination thereof; S524: forming an etching protection layer 20 on one side of the panel function layer 23 away from the substrate area 11. The etching protection layer 20 has at least one narrow slit 211 exposing a part of the substrate area 11, a projection of the narrow slit 231 of the panel function layer 23 coincides with a projection of the narrow slit 211 of the etching projection layer 20 on the substrate area 11, so the bending stress dissipation grooves 14 can be formed on a corresponding part of the substrate area 11 through the narrow slit 211 of the etching protection layer 20 and the narrow slit 231 of the panel function layer 23 in the following etching process. The subsequent processes are the same as those in the first process and will not be repeated here. In the third kind of processes, glass substrates covered by panel function layers 23 can be achieved, so that the panel function layers 23 on a plurality of substrates areas (corresponding to subsequent display panels, respectively) can be formed on the glass base material 1 at the same time, greatly saving the time required for manufacturing the function layers, and since the subsequent process of dividing the glass substrate 14 no longer requires the use of a cutting wheel and laser, damage to the already formed function layer caused by cutting wheel and laser can be avoided. At the same time, the product quality and the process speed of the display panel are improved. Furthermore, the bending stress dissipation groove 14 formed on the glass substrate improves bending performance along the preset bending path of the panel in the subsequent panel manufacturing process, greatly saving the time of manufacturing a function layer and improving product quality of the ultra-thin glass substrate.

Above all, the aim of the present discloser is providing a method for manufacturing ultra-thin glass substrates, which can form a bending stress dissipation groove on the glass base material while obtaining the glass substrate from the glass base material, to improve bending performance along the preset bending path of the panel in the subsequent panel manufacturing process, greatly saving the time of manufacturing a function layer and improving product quality of the ultra-thin glass substrate.

The above is a detailed description of the present disclosure in connection with the specific preferred embodiments, and the specific embodiments of the present disclosure are not limited to the description. Modifications and substitutions can be made without departing from the spirit and scope of the present disclosure.

What is claimed is:

1. A method for manufacturing ultra-thin glass substrates comprising the following steps:
   S510: providing a glass base material preset with n substrate areas and a skeleton area surrounding the substrate areas, wherein n is greater than or equal to 1;
   S520: at least forming an etching protection layer on each of an upper surface and a lower surface of each substrate area of the glass base material, respectively, wherein, each etching protection layer comprises a main area and at least one thinned area extending along a preset bending path;
   S530: at least etching the skeleton area of the glass base material to separate the substrate areas from the glass base material, forming at least one bending stress dissipation groove extending along the preset bending path on each substrate area through the thinned area, and forming a stress dissipation edge along an edge of each substrate area;
   S540: removing the etching protection layer to get independent glass substrates having the bending stress dissipation groove;
   wherein, the step S520 comprises the following steps:
   S521: forming a polymeric reinforcing layer on at least one side of the upper surface and the lower surface of each substrate area of the glass base material, wherein the polymeric reinforcing layer comprises a slit, components of the polymeric reinforcing layer comprise acrylic, organic polymer material containing silicon, epoxy resin, fluororesin, polyamide, polyimide, polycarbonate, polyethylene terephthalate and poly-1,4-cyclohexanedimethyl terephthalate;

S522: forming an etching protection layer on one side of the polymeric reinforcing layer away from each substrate area, the etching protection layer having at least one narrow slit exposing a part of each substrate area, a projection of the narrow slit of the polymeric reinforcing layer coinciding with a projection of the narrow slit of the etching protection layer on the substrate area.

2. The method of claim 1, wherein, the substrate areas are arranged in a matrix arrangement on the glass base material, and adjacent substrate areas are separated from each other by the skeleton area.

3. The method of claim 1, wherein, the thinned area is a strip-shaped area extending along the preset bending path.

4. The method of claim 1, wherein, at least one narrow slit parallel to the preset bending path is provided in the thinned area, and a part of each substrate area is exposed from the narrow slit.

5. The method of claim 1, wherein, a thickness of the thinned area of the etching protection layer is smaller than a thickness of the main area of the etching protection layer.

6. The method of claim 1, wherein, the etching protection layer comprises an etching buffer layer to reduce etching and an etching barrier layer to block etching, the etching buffer layer and the etching barrier layer are set on a same layer, the etching buffer layer forms the thinned area, and the etching barrier layer forms the main area of the etching protection layer.

7. The method of claim 1, wherein, by using one etching process, the whole skeleton area of the glass base material is removed, the at least one bending stress dissipation groove extending along the preset bending path is formed on each substrate area, and the stress dissipation edge is formed along the edge of each substrate area.

8. A method for manufacturing a display panel comprising the method for manufacturing ultra-thin glass substrates of claim 1, wherein the bending stress dissipation groove is configured to be located on the bending path of the display panel.

9. A method for manufacturing ultra-thin glass substrates comprising the following steps:

S510: providing a glass base material preset with n substrate areas and a skeleton area surrounding the substrate areas, wherein n is greater than or equal to 1;

S520: at least forming an etching protection layer on each of an upper surface and a lower surface of each substrate area of the glass base material, respectively, wherein, each etching protection layer comprises a main area and at least one thinned area extending along a preset bending path;

S530: at least etching the skeleton area of the glass base material to separate the substrate areas from the glass base material, forming at least one bending stress dissipation groove extending along the preset bending path on each substrate area through the thinned area, and forming a stress dissipation edge along an edge of each substrate area;

S540: removing the etching protection layer to get independent glass substrates having the bending stress dissipation groove;

wherein the step S520 comprises the following steps:

S523: forming a panel function layer on at least one side of the upper surface and the lower surface of each substrate area of the glass base material, the panel function layer having a narrow slit, wherein the panel function layer comprises one of a TFT rear panel, an organic light emitting layer, a touch detection layer, a fingerprint identification layer, and a cover plate or a combination thereof;

S524: forming the etching protection layer on one side of the panel function layer away from each substrate area, the etching protection layer having at least one narrow slit exposing a part of each substrate area, a projection of the narrow slit of the panel function layer coinciding with a projection of the narrow slit of the etching protection layer on the substrate area.

* * * * *